Dec. 25, 1956 R. K. NORTON 2,775,197
GRIPPER MECHANISM
Filed Aug. 26, 1953 5 Sheets-Sheet 1
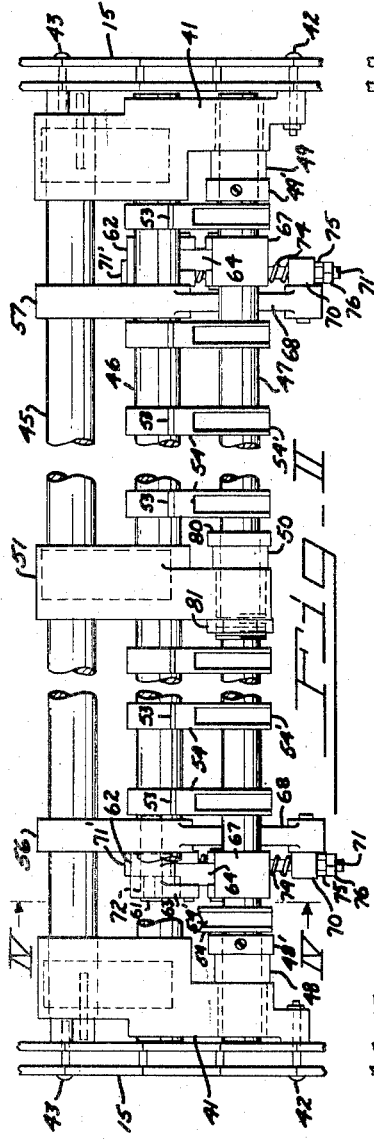
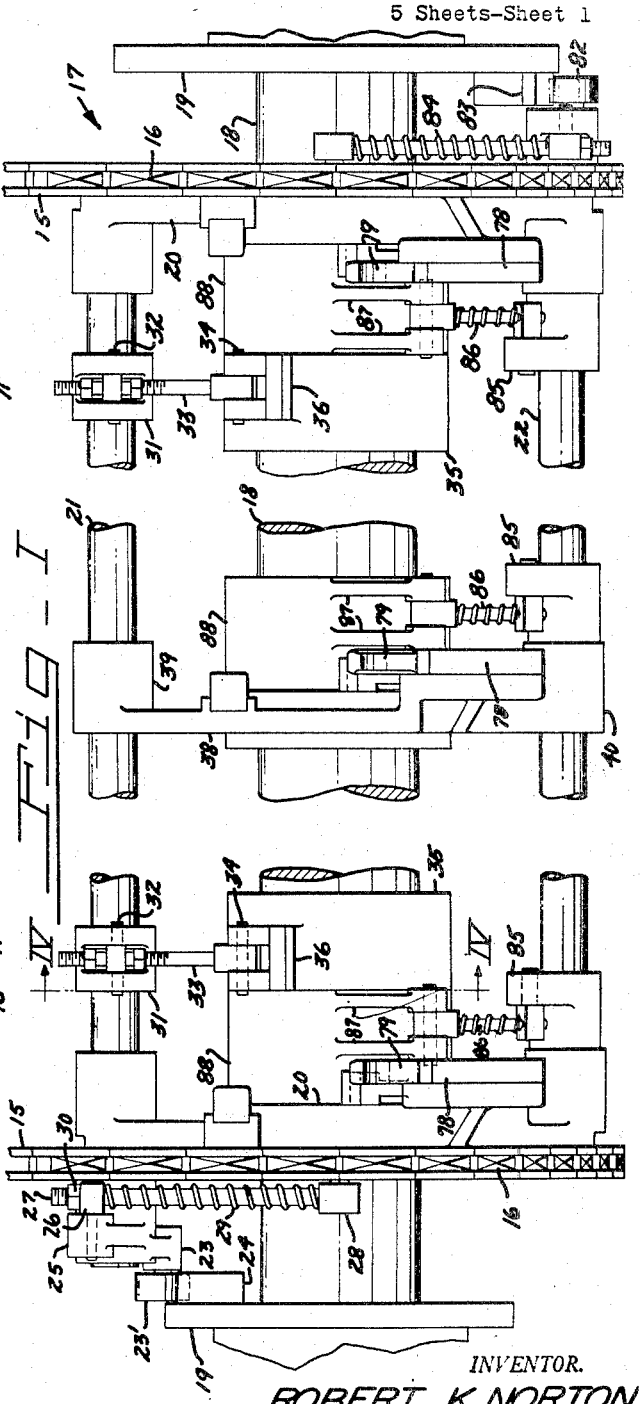
INVENTOR.
ROBERT K. NORTON
BY Hudson, Boughton,
Williams, David & Hoffman
ATTORNEYS Dec. 25, 1956 R. K. NORTON 2,775,197
GRIPPER MECHANISM
Filed Aug. 26, 1953 5 Sheets-Sheet 2
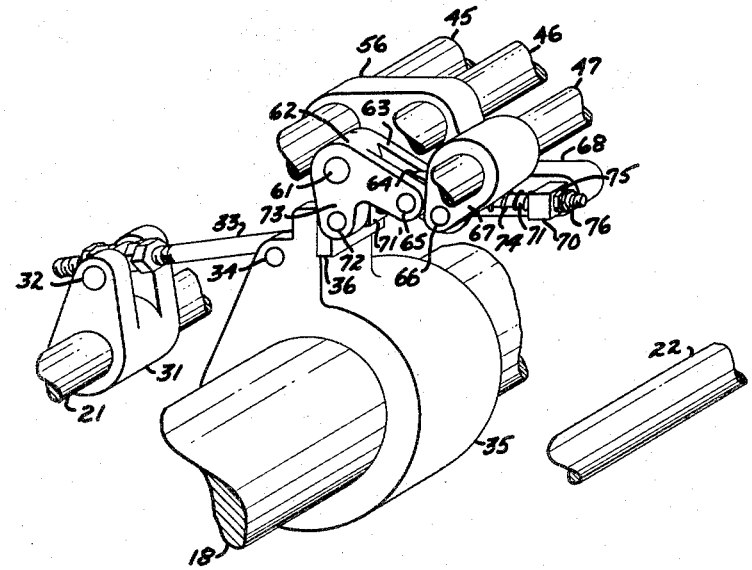
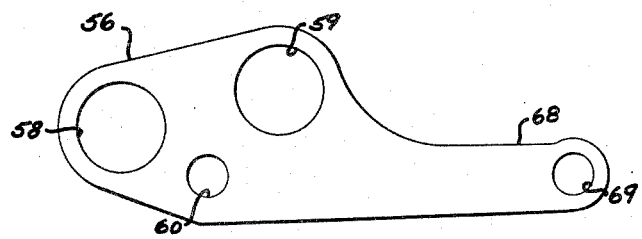
INVENTOR.
ROBERT K. NORTON
BY Hudson, Boughton
Williams, David & Hoffmann.
ATTORNEYS Dec. 25, 1956    R. K. NORTON    2,775,197
GRIPPER MECHANISM
Filed Aug. 26, 1953    5 Sheets-Sheet 3
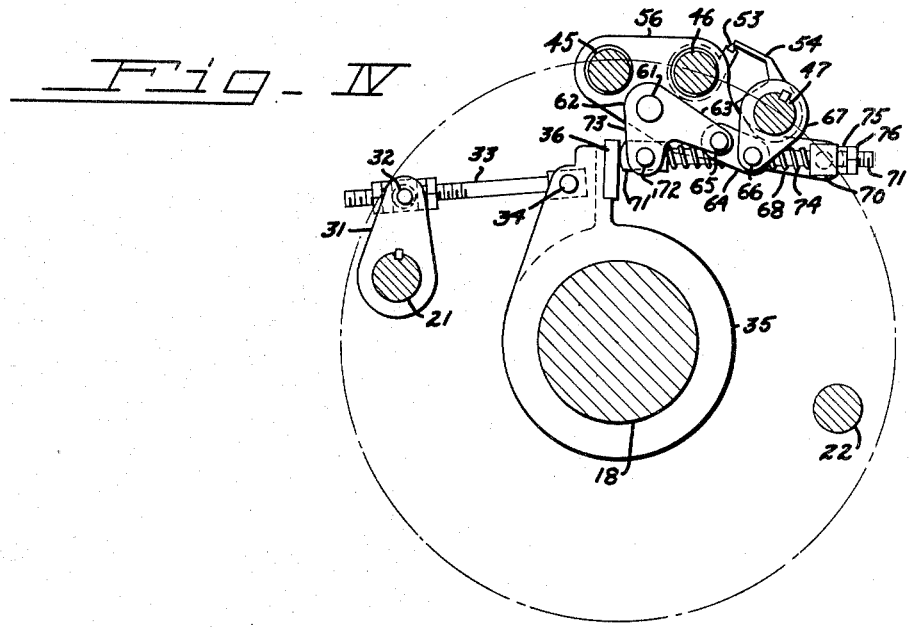
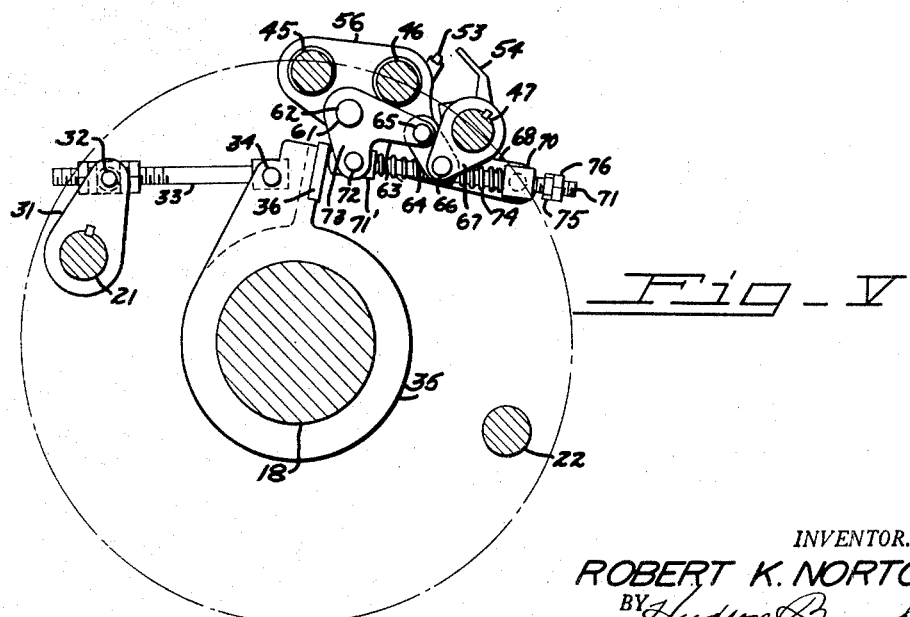
INVENTOR.
ROBERT K. NORTON
BY Hudson, Creighton,
Williams, David & Hoffmann
ATTORNEYS

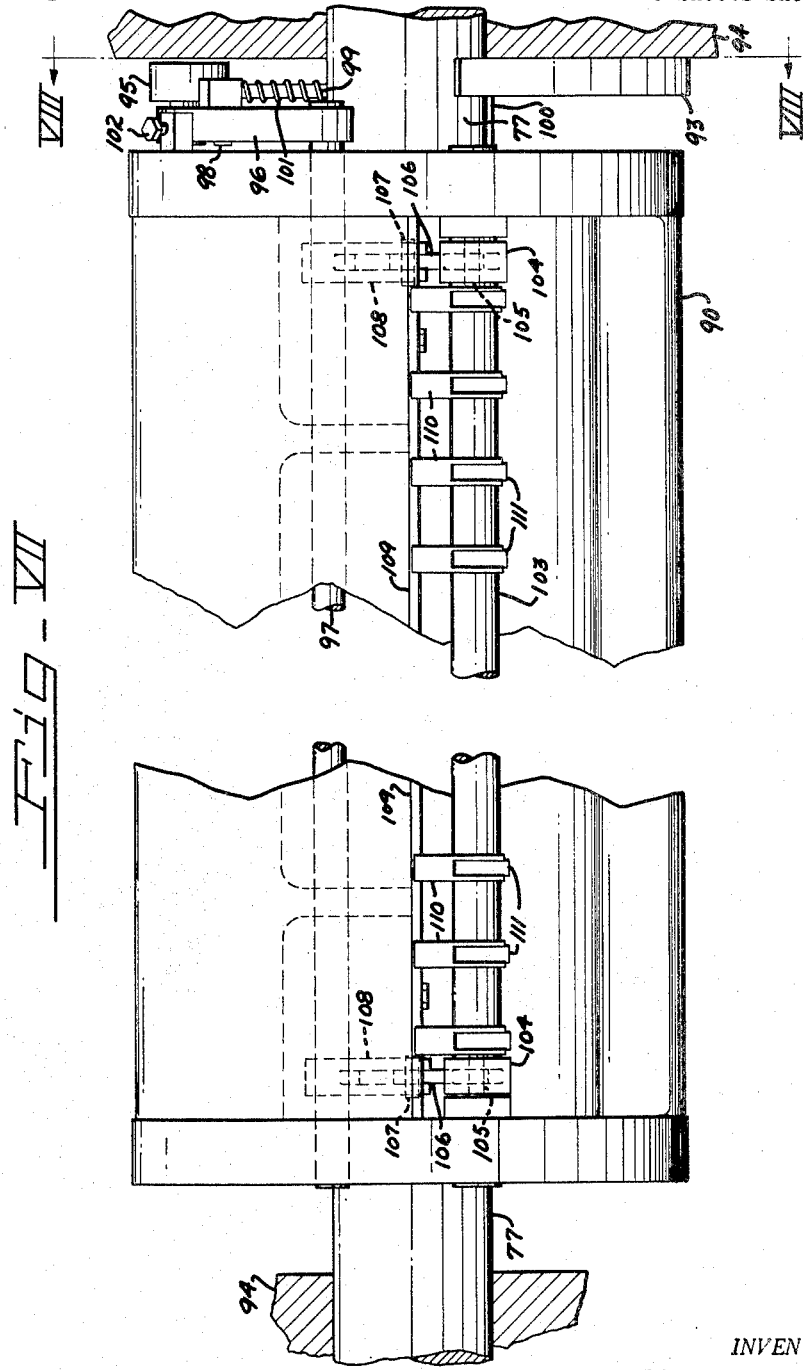

Dec. 25, 1956 R. K. NORTON 2,775,197
GRIPPER MECHANISM
Filed Aug. 26, 1953 5 Sheets-Sheet 5
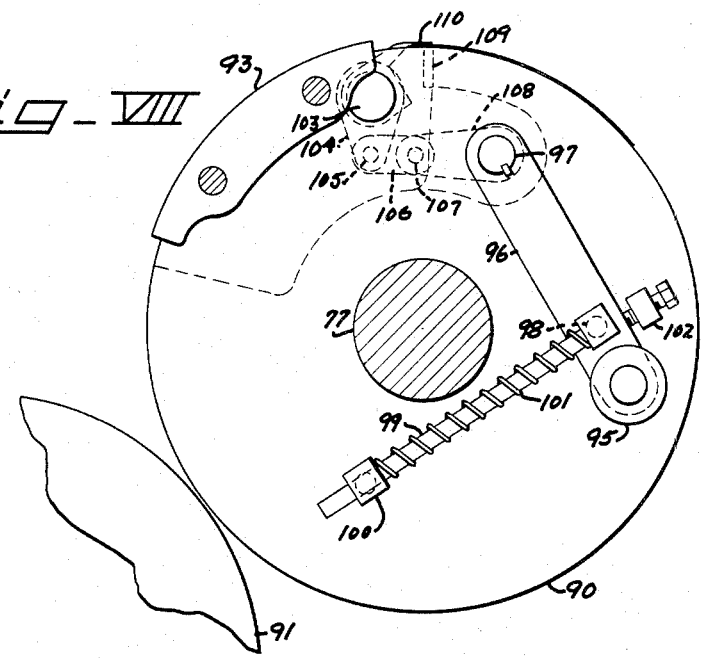
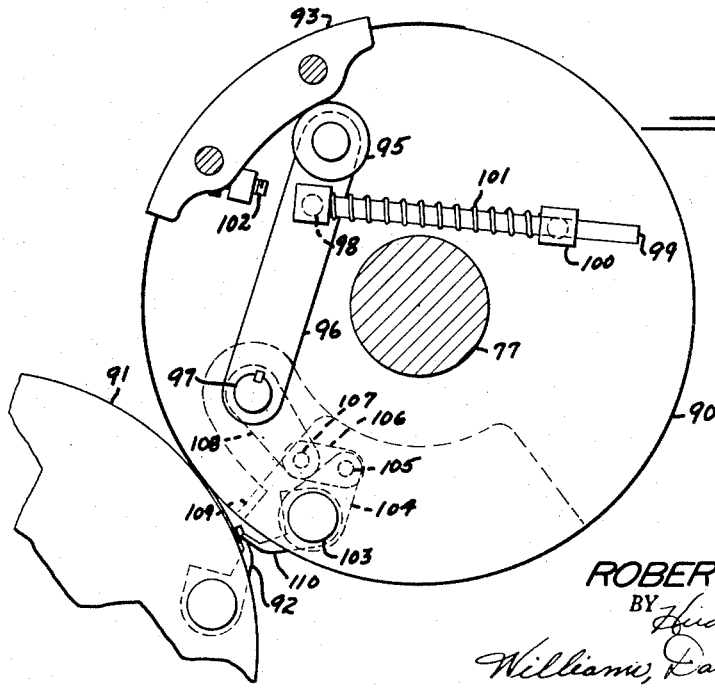
INVENTOR.
ROBERT K. NORTON United States Patent Office 2,775,197
Patented Dec. 25, 1956

2,775,197

GRIPPER MECHANISM

Robert K. Norton, Twinsburg, Ohio, assignor to Harris-Seybold Company, Cleveland, Ohio, a corporation of Delaware Application August 26, 1953, Serial No. 376,637

8 Claims. (Cl. 101—409)

This invention relates to improvements in gripper mechanisms, that is to say mechanisms for operating the sheet gripping fingers on gripper assemblies constituting parts of a chain conveyor, or sheet gripping fingers on the impression cylinders of a printing press or on transfer cylinders for transferring a sheet from one printing unit to the next, or wherever sheets are to be maintained in register during transit.

One of the objects of the invention is the provision of mechanism for operating sheet grippers in which a toggle connection is incorporated and arranged to be in toggle on position when the grippers are closed, whereby "bouncing" of the grippers in the closing operation shall be virtually impossible.

Another object is the provision of a toggle connection in the gripper operating mechanism which shall make possible the employment of much lighter springs than are conventionally used for a similar purpose.

Another object is the provision of means for reducing gripper shaft torsion to a minimum.

Other objects and features of novelty will appear as I proceed with the description of those embodiments of the invention which, for the purposes of the present application, I have illustrated in the accompanying drawings, in which—

Fig. I is a fragmental plan view of a skeleton transfer cylinder forming part of a chain conveyor in which my invention is incorporated;

Fig. II is a plan view of a gripper shaft assembly mounted on the chains of the chain conveyor;

Fig. III is a fragmental perspective view illustrating my improved means for operating the gripper shaft of a gripper shaft assembly, the assembly being in the position in which the toggle is about to be broken and the gripper shaft turned to gripper open position;

Fig. IV is a fragmental sectional view taken substantially on the line IV—IV of Fig. I and IV—IV of Fig. II, showing the assembly in register with the transfer cylinder and the toggle in toggle on position with the grippers closed;

Fig. V is a similar view but with the toggle broken and the grippers open;

Fig. VI is a detail elevational view of one of a pair of brackets forming part of the gripper shaft assembly;

Fig. VII is a plan view, partially broken away, of an impression cylinder or the like equipped with the gripper mechanism of my invention;

Fig. VIII is an end view taken along line VIII—VIII of Fig. VII, showing the toggle in toggle on position and the grippers closed; and Fig. IX is a view similar to Fig. VIII showing the toggle broken and the grippers in gripper open position.

In Figs. I to VI of the drawings, in which the application of the invention to a chain transfer is illustrated, the endless chains of the chain transfer are shown at 15. These chains run over sprocket wheels 16 on a skeleton transfer cylinder 17 having a central shaft 18 journaled at each end in the machine frame 19. The sprocket wheels 16 are attached to hubs 20 keyed to shaft 18. In hubs 20 are journaled eccentrically shafts 21 and 22.

Shaft 21 extends through the sprocket wheel 16 on the left side of the machine as viewed in Fig. 1. On the outer side of the sprocket there is keyed to the shaft a lever comprising an arm 23 carrying a roller follower 23' which is adapted to run upon a cam 24 that is fixed to the frame 19 of the machine. The other arm 25 of the lever carries a noddle pin 26 in which there is a hole to receive a rod 27 that is pivotally mounted at 28 on the sprocket wheel 16. A spring 29 surrounding rod 27 bears against the noddle pin 26. Cam 24 is thus adapted to turn shaft 21 through a small angle in one direction and spring 29 returns it through the same angle when follower 23' drops off the cam 24. A nut 30 threadably mounted on the outer end of rod 27 constitutes an adjustable stop to limit the extent of the return movement. Keyed to the shaft 21 near each end thereof there is a bifurcated crank arm 31 carrying a pivot pin 32 in which there is adjustably mounted one end of a link 33, the opposite end of which carries an eye that surrounds a pin 34 carried by a projecting portion of a bracket in the form of a collar 35 which rotatably surround the central shaft 18 of the skeleton transfer cylinder. On this collar there is an abutment 36, the purpose of which will presently appear. About midway of the length of the cylinder there is a casting or its equivalent 38 mounted on central shaft 18 and having at its ends bearings 39 and 40 in which shafts 21 and 22 are journaled.

A gripper shaft assembly traveling with the chains 15 is illustrated in Fig. II. It comprises a pair of end plates 41 which are supported on the chains by means of extensions of chain pins 42 and 43, provision being made for accommodating the difference in spacing of these pins as the chain travels in the straightaway and as it travels around the sprockets, which means is illustrated more in detail in my copending application Serial No. 376,624, filed of even date herewith. In these plates 41 there are rigidly mounted two transverse bars, herein illustrated as shaft 45 and 46. A third shaft 47 is rotatably carried by plates 41 and is journaled in bushings 48, 49 and 50. Bushings 48 and 49 are shouldered against end plates 41, while bushing 50 is mounted in a central plate or bracket 51 carried by the fixed shafts 45 and 46. Collars 48' and 49' are fixed to the shaft 47 adjacent the bushings to prevent axial movement of the shaft 47 with respect to the assembly.

Shaft 46 at spaced intervals along its length carries gripper pads 53, and on shaft 47 there is a corresponding number of gripper fingers 54 adapted to bear against the gripper pads when the grippers are in closed position. Gripper dogs 54' each have individual spring means urging the grippers to closed position. Fixed upon shafts 45 and 46 near the opposite ends of the gripper assembly there are two brackets 56 and 57, each of which has two openings 58 and 59, as illustrated in Fig. VI, to receive those shafts. In each of these brackets there is a hole 60 in which is mounted a pivot pin 61. On each pin a bell crank lever 62 is oscillatably mounted. One arm 63 is bifurcated to receive one end of a link 64 that is pivoted at 65 to the arm 63. Its other end is pivotally mounted at 66 in the bifurcated end of a crank arm 67 that is keyed or otherwise fixed to shaft 47.

Brackets 56 and 57 each have a forward extension 68 that is disposed beneath shaft 47 and is provided at its forward extremity with a hole 69, in which is mounted a noddle pin 70. Through a smooth hole in this pin there extends a rod 71, one end of which carries a head 71' that is pivotally mounted at 72 in the short arm 73 of bell crank 62. Between the head 71' and noddle pin 70 there is a spring 74 surrounding the rod and tending to swing bell crank 62 in the counterclockwise direction. A nut 75 is threadably mounted on the outer end of rod 71 to adjustably limit the extent of clockwise movement of bell crank 62 and thereby determine the alignment of the parts 61, 65 and 66. A lock nut 76 is preferably provided also to hold the adjustment fixed. Head 71' of rod 71 bears against abutment 36 on collar 35. The turning of collar 35 clockwise upon shaft 18 results in abutment 36 pressing against head 71' and turning bell crank 62 counterclockwise as illustrated in Fig. V, whereby the toggle connection consisting of the link 64 and the arm 63 of the bell crank is broken. When the crank arm 31 on shaft 21 swings in the counterclockwise direction the abutment 36 is withdrawn and the spring 74 is permitted to expand, which turns bell crank 62 in the clockwise direction to the Fig. IV position, that is until the nut 75 on the rod contacts the noddle pin 70 at which point the toggle connection is "on toggle" with the axes of pivots 61, 65 and 66 lined up approximately. While the brackets 56 and 57 with the accompanying gripper actuators are illustrated as near the ends of the gripper assembly, positions further toward the center of the assembly are suitable, those positions being selected which are found to most effectively reduce the torsional deflection of the gripper shaft.

Each of the hubs 20 at the ends of the skeleton cylinder 17 and casting 38 at the middle thereof carries a centering block 78 in which there is formed a socket 79 of circular contour and of about semicircular extent, these centering blocks being adapted to receive the bushings 48, 49 and 50 when one of the gripper assemblies of the chain conveyor comes into registering position on the skeleton cylinder 17. By this means the assembly is registered in the direction of travel of the conveyor and radially, as explained more fully in my copending application above mentioned. Also the assembly is registered properly in the transverse direction by the central bushing 50, the outer bearing surface of which is somewhat narrower than the corresponding surfaces of bushings 48 and 49 in order to receive rather snugly the middle centering block 78. Bushing 50 has a flange 80 and a portion of reduced diameter which extends through a hole in bracket 51 surrounding shaft 47 and is threaded on its other extremity to take a nut 81 by means of which the bushing is clamped in position. The width of the bushing between the flange 80 and the bracket is accurately dimensioned to receive centering block 78, and the latter is bevelled at the end first contacted by the bushing so as to facilitate the guiding of the bushing into position on the centering block and the consequent accurate transverse registration of the gripper assembly upon the skeleton cylinder. This feature of the construction is covered more in detail in my aforesaid pending application.

The shaft 22 in the skeleton cylinder is oscillated by a lever on the right hand end of the shaft beyond the sprocket 16, which lever is swung in one direction by a cam follower 82 that is adapted to bear once during each revolution of the cylinder against a cam 83 fixed to the frame 19. It is returned by a spring 84 when the cam 83 permits. Between the sprockets the shaft carries crank arms 85 which function through push rods 86 and bifurcations 87 on collars 88 that surround shaft 18 to operate hooks, not shown, for momentarily locking the gripper assembly to the skeleton cylinder. These elements form no part of the present invention and are more fully described in the aforesaid pending application to which reference may be had.

In Figs. VII, VIII and IX I have illustrated a form of toggle connection mechanism involving the present invention which may be applied to grippers mounted on an impression cylinder, on a transfer cylinder or other sheet handling cylinder. In the drawings I have illustrated by way of example an impression cylinder 90 with a shaft 77 journaled in the frame 94 and arranged to take sheets one at a time from a cooperating cylinder indicated at 91 and having sheet grippers 92 which may be of conventional form and may be operated by conventional means or by the means illustrated in connection with cylinder 90.

93 is a cam which is fixed upon the frame 94. It is adapted to be contacted by a roller follower 95 which is journaled on the free extremity of an arm 96 keyed to a shaft 97 that extends through the cylinder 90 and is oscillatably mounted in the end walls thereof. On arm 96 near its outer end there is pivotally mounted at 98 the headed end of a rod 99, the opposite end of which extends through a hole in a noddle pin 100 that is mounted on the adjacent end wall of cylinder 90. A spring 101 surrounding the rod serves to hold the follower 95 on its cam and also to swing arm 96 counterclockwise up against a stop 102 on the cylinder when the cam permits.

The gripper shaft 103 is journaled in the side walls of the cylinder spaced a short distance from the shaft 97. At each end of shaft 103 there is secured to the shaft a crank arm 104 having bifurcations carrying a pin 105 upon which is pivotally mounted a link 106, the other end of the link being pivotally mounted at 107 between bifurcations of an arm 108 that is keyed to shaft 97. The arm 96 and the arms 108 in effect constitute bell crank levers having the same function as the bell crank levers 62 of the first described form of the invention. In the drawings there is shown a gripper pad 109 against which gripper fingers 110 spaced along shaft 103 are adapted to bear for gripping a sheet. Gripper dogs 111 are fixed to shaft 103, there being one dog for each gripper finger. Spring means intermediate each of the gripper dogs 111 and fingers 110 urge the fingers against the pad 109 in the usual manner.

Operation. Referring to the first described form of the invention and more especially to Figs. III, IV and V, let it be assumed that the parts are in the position of Figs. III and IV. The actuating shaft 21 will now be turned clockwise by the action of fixed cam 24 upon roller follower 23'. Link 33 will then be moved toward the right, causing abutments 36 to press against the heads 71' of rods 71. The pivot 72 of each bell crank 62 will thereby be turned counterclockwise to the position of Fig. V, breaking the toggle connection 63, 64 and swinging crank arm 67 clockwise, thereby lifting gripper fingers 54 off their gripper pads 53. A sheet will then be presented to the grippers by a cooperating cylinder, not shown, after which shaft 21 will be turned in the opposite direction, that is counterclockwise as viewed in Figs. IV and V, whereupon the pressure of abutment 36 against the head 71' of pin 71 will be relieved and spring 74 will come into action, swinging the bell crank 62 in the clockwise direction and bringing the toggle connection into toggle on position as viewed in Fig. IV. The presented sheet will thereby be gripped by the gripper assembly and carried forward by the chain conveyor.

The closing of the grippers on a sheet is accomplished with light springs because of the mechanical advantage resulting from the use of the toggle connection. As compared with the spring necessary on the conventional gripper mechanism, the spring of the present invention need exert only a fraction of the force of springs previously employed. Furthermore the gripping action is smoother and more accurate because the gripper closing action takes place without "bounce," that is to say rebound of the gripping fingers such as frequently occurs in conventional gripper mechanisms. In my construction the on toggle condition which obtains when the gripper fingers close on the sheet effectively prevents such rebound.

The operation of the form of the invention illustrated in Figs. VII, VIII and IX is similar in principle to that of the first described form. In other words the gripper fingers 110 are thrown to open position by the contact of roller follower 95 with fixed cam 93, the arm 96 and each of the arms 108 then acting together as bell cranks. As soon as the follower 95 runs down off the cam 93, spring 101 actuates the bell cranks 96, 108 in the opposite direction, bringing into line each of the arms 108 and the corresponding links 106 so as to put the toggles into toggle on position and close the sheet grippers 110 upon their pad 109.

Having thus described my invention, I claim:

1. In a sheet handling machine, sheet gripper means adapted to engage the forward edge of a sheet, said means comprising a gripper shaft, sheet grippers mounted on said shaft, gripper pads with which said sheet grippers are adapted to cooperate, a crank keyed to said shaft, a second shaft the axis of which is fixed with respect to the axis of said gripper shaft, a toggle connection between said crank and said second shaft comprising an arm on said second shaft and a link pivotally connected with said arm and crank, the substantial alignment of said arm and link constituting toggle on position and corresponding to the closed position of said sheet grippers, and gripper-operating means comprising cam means and spring means, one for turning said arm to break the toggle connection, and the other for returning the toggle connection to toggle-on position and the grippers to said gripping positions.

2. Sheet gripper means as defined in claim 1, wherein the arm of said toggle connection comprises one arm of a bell crank lever, said second shaft being the pivotal support for said bell crank, the mechanical means for turning said arm operating to swing the other arm of said bell crank in one direction to break said toggle and open said sheet grippers.

3. Sheet gripper means as defined in claim 1, wherein said two shafts are parallel and extend crosswise of the machine, and wherein there is one of said toggle connections with accompanying spring at each end of the two shafts, whereby torsion in the gripper shaft is reduced to a minimum and accuracy in gripper action is promoted.

4. Gripper mechanism for use in a chain conveyor of the type in which two endless chains run over two sprockets at the ends of the skeleton cylinder, a gripper shaft assembly comprising a pair of opposed plates adapted for connection with said chains, a cross member fixed in said plates carrying gripper pads, a gripper shaft rotatably mounted in said plates, a crank keyed to said gripper shaft, a bracket mounted on said cross member, a bell crank pivotally mounted on said bracket, a link pivoted to said crank, said link and one arm of said bell crank being pivotally joined together and constituting a toggle connection, mechanical means carried by said skeleton cylinder for swinging said bell crank in one direction to break said toggle and open said grippers, and springs means carried by said bracket for swinging said bell crank in the opposite direction to put said toggle into toggle on position and close said grippers.

5. Gripper mechanism for use in a chain transfer of the type in which two endless chains run over two sprockets at the ends of a skeleton cylinder, a gripper shaft assembly comprising a pair of opposed plates adapted for connection with said chains, a cross member fixed in said plates carrying gripper pads, a gripper shaft rotatably mounted in said plates, two cranks keyed to said gripper shaft at opposite sides of the center thereof, two brackets carried by said cross member at positions corresponding to the positions of said cranks, a bell crank pivotally mounted on each of said brackets, a link pivoted to each of said cranks, each of said links and one arm of the corresponding bell crank being pivotally joined together and constituting a toggle connection, mechanical means carried by said skeleton cylinder for swinging each of said bell cranks in one direction to break said toggles and open said grippers, and spring means carried by each of said brackets for swinging said bell cranks in the opposite direction to put said toggles into toggle on position and close said grippers, whereby torsion in said gripper shaft is reduced to a minimum and accuracy in gripper action is promoted.

6. In combination, a frame, a cylinder having a central shaft mounted in said frame and having sprockets at its ends, an endless conveyor comprising two chains running over said sprockets, a gripper assembly carried by said chains for travel around said cylinder, an oscillatable shaft journaled eccentrically in said sprockets, cam means on said frame and oscillatable shaft for turning the shaft through a limited angle, a crank arm on said oscillatable shaft, a collar rotatably mounted on said central shaft, a link pivotally connected to said crank arm and to said collar, an abutment on said collar, a rod carried by said assembly adapted to be shifted endwise by said abutment, and means actuated by said rod for turning said gripper shaft to open said grippers.

7. Mechanism as defined in claim 6, comprising also spring means carried by said gripper assembly for shifting said rod in the opposite direction to close said grippers when said oscillatable shaft turns in the opposite direction.

8. Mechanism as defined in claim 6, wherein there are two crank arms and two rotatable collars at opposite sides of the center of the cylinder and two endwise movable rods at corresponding positions on said gripper assembly, and means on said assembly actuatable by each of said rods for turning said gripper shaft to open said grippers.

References Cited in the file of this patent
UNITED STATES PATENTS

| | | |
|---|---|---|
| 2,184,725 | Stobb | Dec. 26, 1939 |
| 2,380,744 | Ford | July 31, 1945 |
| 2,392,391 | Kaddeland | Jan. 8, 1946 |
| 2,392,392 | Kaddeland | Jan. 8, 1946 |